United States Patent
Babbush (10) Patent No.: US 12,153,645 B2
(45) Date of Patent: *Nov. 26, 2024

(54) PLANE WAVE DUAL BASIS FOR QUANTUM SIMULATION

(71) Applicant: Google LLC, Mountain View, CA (US)

(72) Inventor: Ryan Babbush, Venice, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,051

(22) Filed: May 5, 2023

(65) Prior Publication Data
US 2023/0315803 A1 Oct. 5, 2023

Related U.S. Application Data

(63) Continuation of application No. 16/603,978, filed as application No. PCT/US2018/033440 on May 18, 2018, now Pat. No. 11,681,775.

(60) Provisional application No. 62/508,843, filed on May 19, 2017.

(51) Int. Cl.
| G06F 17/14 | (2006.01) |
| G06E 3/00 | (2006.01) |
| G06F 17/18 | (2006.01) |
| G06N 10/00 | (2022.01) |
| H04L 9/08 | (2006.01) |

(52) U.S. Cl.
CPC ........... *G06F 17/141* (2013.01); *G06E 3/005* (2013.01); *G06F 17/18* (2013.01); *G06N 10/00* (2019.01); *H04L 9/0852* (2013.01)

(58) Field of Classification Search
CPC ........ G06F 17/141; G06F 17/18; G06F 30/20; G06F 2111/10; G06E 3/005; G06N 10/00; H04L 9/0852

USPC .............................................................. 705/2
See application file for complete search history.

(56) References Cited

U.S. PATENT DOCUMENTS

| 9,984,333 B2 | 5/2018 | Biamonte et al. |
| 2003/0005010 A1 | 1/2003 | Cleve et al. |
| 2005/0182614 A1 | 8/2005 | Meredith |
| 2015/0363708 A1 | 12/2015 | Amin et al. |

(Continued)

FOREIGN PATENT DOCUMENTS

| CN | 102226874 | 10/2011 |
| CN | 105993017 | 10/2016 |
| JP | 2018-533106 | 11/2018 |

(Continued)

OTHER PUBLICATIONS

Babbush et al, "Low-depth quantum simulation of materials" Physical Review, Mar. 2018, 40 pages.

(Continued)

*Primary Examiner* — Tan V Mai
(74) *Attorney, Agent, or Firm* — Fish & Richardson P.C.

(57) ABSTRACT

Methods, systems and apparatus for simulating quantum systems. In one aspect, a method includes the actions of obtaining a first Hamiltonian describing the quantum system, wherein the Hamiltonian is written in a plane wave basis comprising N plane wave basis vectors; applying a discrete Fourier transform to the first Hamiltonian to generate a second Hamiltonian written in a plane wave dual basis, wherein the second Hamiltonian comprises a number of terms that scales at most quadratically with N; and simulating the quantum system using the second Hamiltonian.

20 Claims, 2 Drawing Sheets

(56) References Cited

U.S. PATENT DOCUMENTS

2016/0012346 A1 1/2016 Biamonte et al.
2016/0283857 A1 9/2016 Babbush et al.

FOREIGN PATENT DOCUMENTS

| WO | WO 2008006217 | 1/2008 |
|---|---|---|
| WO | WO 2015069625 | 5/2015 |
| WO | WO 2015123085 | 8/2015 |
| WO | WO 2017027733 | 2/2017 |

OTHER PUBLICATIONS

Brown et al, "Using Quantum Computers for Quantum Simulation" Entropy 2010, 40 pages.
Office Action in Australian Application No. 2018270115, dated Dec. 24, 2020, 8 pages.
Office Action In Australian Application No. 2018270115, dated Sep. 24, 2020, 6 pages.
Jiang et al, "Non-commuting two-local Hamiltonians for quantum error suppression" arXiv, 2017, 25 pages.
Office Action in Australian Application No. 2018270115, dated Aug. 5, 2020, 8 pages.
Roy et al, "Topological Quantum Computing" arXiv, 2017, 18 pages.
Notice of Acceptance in Australian Appln. No. 2021215213, dated Nov. 10, 2022, 3 pages.
Office Action in Australian Appln. No. 2021215213, dated Aug. 5, 2022, 3 pages.
CA Office Action in Canadian Application No. 3,061,234, dated Dec. 4, 2020, 4 pages.
Office Action in Chinese Appln. No. 201880033127.X, dated Dec. 2, 2022, 19 pages (with English Translation).
O'Malley et al., "Scalable Quantum Simulation of Molecular Energies," Phys. Rev. X 6,, Jul. 18, 2016, 13 pages.
Roushan et al., "Chiral ground-state currents of interacting photons in a synthetic magnetic field," Nature Physics, Oct. 31, 2016, 6 pages.
JP Office Action in Japanese Application No. 2019-563853, dated Feb. 22, 2021, 7 pages (with English translation).
Office Action in Japanese Appln. No. 2021-119638, dated Nov. 7, 2022, 12 pages (with English Translation).
International Preliminary Report on Patentability in International Appln. No. PCT/US2018/033440, mailed on Nov. 19, 2019, 9 pages.
International Search Report and Written Opinion in International Appln. No. PCT/US2018/033440, mailed on Aug. 16, 2018, 15 pages.
Kivlichan et al, "Bounding the costs of quantum simulation of many-body physics in real space," arXiv, Oct. 2016, 23 pages.
Skylaris et al, "Introducing ONETEP: Linear-scaling density functional simulations on parallel computers" Journal of Chemical Physics, Feb. 2005, 10 pages.
Abrams et al., "Simulation of Many-Body Fermi Systems on a Universal Quantum Computer," Phys. Rev. Lett., Sep. 29, 1997, 79(13):2586-2589.
Aharonov et al., "Adiabatic quantum state generation and statistical zero knowledge," STOC '03: Proceedings of the thirty-fifth annual ACM symposium on Theory of computing, Jun. 9, 2003, pp. 20-29.
Aspuru-Guzik et al., "Simulated Quantum Computation of Molecular Energies," Science, Sep. 9, 2005, 309(5741):1704-1707.
Babbush et al., "Adiabatic Quantum Simulation of Quantum Chemistry," Scientific Reports, Oct. 13, 2014, 11 pages.
Babbush et al., "Chemical basis of Trotter-Suzuki errors in quantum chemistry simulation," Phys. Rev. A 91, Feb. 17, 2015, 17 pages.
Babbush et al., "Exponentially more precise quantum simulation of fermions in second quantization," New Journal of Physics, Mar. 24, 2016, 18 pages.
Barends et al., "Digitized adiabatic quantum computing with a superconducting circuit," Nature, Jun. 8, 2016, pp. 222-226.
Berry et al., "Efficient Quantum Algorithms for Simulating Sparse Hamiltonians," Communications in Mathematical Physics, Dec. 14, 2006, pp. 359-371.
Berry et al., "Exponential improvement in precision for simulating sparse Hamiltonians," Symposium on Theory of Computing, May 2014, pp. 283-292.
Berry et al., "Simulating Hamiltonian Dynamics with a Truncated Taylor Series," Phys. Rev. Lett. 114, Mar. 3, 2015, 5 pages.
Berry et al., Gate-efficient discrete simulations of continuous-time quantum query algorithms, arXiv, Apr. 5, 2013, 28 pages.
Boghosian et al., "Simulating quantum mechanics on a quantum computer," Physica D: Nonlinear Phenomena, Sep. 1, 1998, 120(1-2):30-42.
Boixo et al., "Characterizing Quantum Supremacy in Near-Term Devices," arXiv, Apr. 5, 2017, 23 pages.
Bravyi et al., "Fermionic Quantum Computation," Annals of Physics, May 25, 2002, 298(1):210-226.
Bravyi et al., "Tapering off qubits to simulate fermionic Hamiltonians," arXiv, Jan. 27, 2017, 15 pages.
Ciftja, "Coulomb self-energy of a uniformly charged three-dimensional cube," Physics Letters A, Jan. 17, 2011, 375(3):766-767.
Cleve et al., "Efficient discrete-time simulations of continuous-time quantum query algorithms," STOC '09: Proceedings of the forty-first annual ACM symposium on Theory of computing, May 2009, pp. 409-416.
Corcoles et al., "Demonstration of a quantum error detection code using a square lattice of four superconducting qubits," Nature Communications, Apr. 29, 2015, 10 pages.
Eichler et al., "Exploring Interacting Quantum Many-Body Systems by Experimentally Creating Continuous Matrix Product States in Superconducting Circuits," Phys. Rev. X, Dec. 16, 2015, 13 pages.
Farhi et al., "A Quantum Approximate Optimization Algorithm," arXiv, Nov. 14, 2014, 16 pages.
Ferris, "Fourier Transform for Fermionic Systems and the Spectral Tensor Network," Physical Review Letters, Jul. 3, 2014, 5 pages.
Feynman, "Simulating physics with computers," International Journal of Theoretical Physics, Jun. 1982, 22 pages.
Hamann et al., "Norm-Conserving Pseudopotentials," Phys. Rev. Lett., Nov. 12, 1979, 4 pages.
Hastings et al., "Improving quantum algorithms for quantum chemistry," arXiv, Mar. 23, 2014, 12 pages.
Havlicek et al., "Operator Locality in Quantum Simulation of Fermionic Models," arXiv, Jan. 24, 2017, 10 pages.
Hohenberg et al., "Inhomogeneous Electron Gas," Phys. Rev., Nov. 9, 1964, 8 pages.
Jones et al., "An efficient basis set representation for calculating electrons in molecules," Molecular Physics, Apr. 27, 2016, 16 pages.
Kandala et al., "Hardware-efficient Variational Quantum Eigensolver for Small Molecules and Quantum Magnets," arXiv, Oct. 13, 2017, 24 pages.
Kassal et al., "Polynomial-time quantum algorithm for the simulation of chemical dynamics," PNAS, Dec. 2, 2008, 105(48):18681-18686.
Kassal et al., "Simulating Chemistry Using Quantum Computers," Ann. Rev. Phys. Chem., Dec. 13, 2010, 62:185-207.
Kato, "On linear differential equations in banach spaces," Communications on Pure and Applied Mathematics, Aug. 1956, 8 pages.
Kelly et al., "State preservation by repetitive error detection in a superconducting quantum circuit," Nature, Mar. 4, 2015, 519:66-69.
Kitaev, "Quantum measurements and the Abelian Stabilizer Problem," arXiv, Nov. 20, 1995, 22 pages.
Lanyon et al., "Towards quantum chemistry on a quantum computer," Nature Chemistry, Feb. 2010, 2(2):106-111.
Li et al., "Solving Quantum Ground-State Problems with Nuclear Magnetic Resonance," Scientific Reports, Sep. 9, 2011, 8 pages.
Lloyd, "Universal Quantum Simulators," Science, Aug. 23, 1996, 273(5278):1072-1078.
Low et al., "Hamiltonian Simulation by Qubitization," arXiv, Jul. 11, 2019, 23 pages.
Low et al., "Optimal Hamiltonian Simulation by Quantum Signal Processing," Phys. Rev. Lett., Jan. 5, 2017, 5 pages.

(56) References Cited

OTHER PUBLICATIONS

McClean et al., "Exploiting Locality in Quantum Computation for Quantum Chemistry," J. Phys. Chem. Lett., Nov. 25, 2014, 5(24):4368-4380.

McClean et al., "Hybrid Quantum-Classical Hierarchy for Mitigation of Decoherence and Determination of Excited States," arXiv, Mar. 17, 2016, 10 pages.

McClean et al., "The theory of variational hybrid quantum-classical algorithms," New Journal of Physics, Feb. 2016, 23 pages.

Novo et al., "Improved Hamiltonian simulation via a truncated Taylor series and corrections," arXiv, Nov. 30, 2016, 10 pages.

Peruzzo et al., "A variational eigenvalue solver on a photonic quantum processor," Nature Communications, Jul. 23, 2014, 7 pages.

Poulin et al., "The Trotter Step Size Required for Accurate Quantum Simulation of Quantum Chemistry," arXiv, Jun. 19, 2014, 13 pages.

Reiher et al., "Elucidating Reaction Mechanisms on Quantum Computers," arXiv, May 25, 2016, 28 pages.

Riste et al., "Detecting bit-flip errors in a logical qubit using stabilizer measurements," Nature Communications, Apr. 29, 2015, 6 pages.

Romero et al., "Strategies for quantum computing molecular energies using the unitary coupled cluster ansatz," arXiv, Feb. 10, 2018, 18 pages.

Santagati et al., "Witnessing eigenstates for quantum simulation of Hamiltonian spectra," arXiv, Jan. 15, 2018, 27 pages.

Seeley et al., "The Bravyi-Kitaev transformation for quantum computation of electronic structure," The Journal of Chemical Physics, Dec. 12, 2012, 17 pages.

Shen et al., "Quantum Implementation of Unitary Coupled Cluster for Simulating Molecular Electronic Structure," arXiv, Nov. 25, 2016, 6 pages.

Shende et al., "Synthesis of quantum-logic circuits," IEEE Transactions on Computer-Aided Design of Integrated Circuits and Systems, Jun. 2006, 25(6): May 8, 2006, pp. 1000-1010.

Shepherd et al., "Convergence of many-body wave-function expansions using a plane-wave basis: From homogeneous electron gas to solid state systems," Phys. Rev. B, Jul. 9, 2012, 14 pages.

Somma et al., "Simulating physical phenomena by quantum networks," Phys. Rev. A, Apr. 9, 2002, 17 pages.

Suzuki, "Improved Trotter-like formula," Physics Letters A, Sep. 6, 1993, 180(3):232-234.

Thomas, "The calculation of atomic fields," Mathematical Proceedings of the Cambridge Philosophical Society, Jan. 1927, 23(5):542-548.

Toloui et al., "Quantum Algorithms for Quantum Chemistry based on the sparsity of the CI-matrix," arXiv, Dec. 15, 2013, 20 pages.

Tranter et al., "The Bravyi-Kitaev transformation: Properties and applications," Quantum Information in Chemistry, Jul. 1, 2015, 115(19):1431-1441.

Trotter, "On the product of semi-groups of operators," Proc. Am. Math. Soc., Aug. 1959, pp. 545-551.

Verstraete et al., "Quantum circuits for strongly correlated quantum systems," Physical Review A, Mar. 16, 2009, 5 pages.

Wang et al., "Quantum Simulation of Helium Hydride Cation in a Solid-State Spin Register," ACS Nano, Apr. 23, 2015, 9(8):7769-7774.

Wecker et al., "Gate-count estimates for performing quantum chemistry on small quantum computers," Phys. Rev. A 90, Aug. 6, 2014, 13 pages.

Wecker et al., "Progress towards practical quantum variational algorithms," Phys. Rev. A 92, Oct. 2, 2015, 10 pages.

Whitfield et al., "Local spin operators for fermion simulations," Phys. Rev. A 94, 030301®, Sep. 14, 2016, 5 pages.

Whitfield et al., "Simulation of electronic structure Hamiltonians using quantum computers," Molecular Physics, Mar. 3, 2011, pp. 735-750.

Extended European Search Report in European Appln. No. 23159240.3, mailed on Aug. 25, 2023, 9 pages.

Notice of Allowance in Australian Appln. No. 2023201068, mailed on Mar. 22, 2024, 3 pages.

Office Action in Australian Appln. No. 2023201068, mailed on Feb. 2, 2024, 3 pages.

Notice of Allowance in Japanese Appln. No. 2023-105332, mailed on Jun. 3, 2024, 5 pages (with English translation).

PLANE WAVE DUAL BASIS FOR QUANTUM SIMULATION

CROSS-REFERENCE TO RELATED APPLICATION

This application is a continuation application and claims the benefit of U.S. patent application Ser. No. 16/603,978, filed Oct. 9, 2019, which application is a National Stage Application under 35 U.S.C. § 371 and claims the benefit of International Application No. PCT/US2018/033440, filed May 18, 2018, which claims the benefit under 35 U.S.C. § 119(e) of priority to U.S. Application No. 62/508,843, filed May 19, 2017, the disclosure of each is incorporated herein by reference.

BACKGROUND

This specification relates to quantum computing.

Applications of quantum computing include quantum simulation. The simulation of quantum systems, e.g., systems of electrons, has applications in a variety of different areas ranging from pharmaceutical synthesis to the design of novel catalysts and materials. However, simulating complex quantum systems using classical techniques is untenable due to the exponential scaling of required resources as a function of system size N. Quantum computers and quantum simulation techniques can offer computationally feasible solutions to this task.

SUMMARY

This specification describes methods and systems for simulating quantum systems. For example, this specification describes methods and systems for performing second quantized simulations of interacting electrons using a plane wave dual basis.

In general, one innovative aspect of the subject matter described in this specification can be implemented in a method for simulating a quantum system, the method comprising: obtaining a first Hamiltonian describing the quantum system, wherein the Hamiltonian is written in a plane wave basis comprising N plane wave basis vectors; applying a fast Fourier transform to the first Hamiltonian to generate a second Hamiltonian written in a plane wave dual basis, wherein the second Hamiltonian comprises a number of terms that scales at most quadratically with N; and simulating the quantum system using the second Hamiltonian.

Other implementations of these aspect include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the first Hamiltonian comprises a kinetic energy operator T that is diagonal in the plane wave basis.

In some implementations the second Hamiltonian comprises a potential energy operator and interaction term that are diagonal in the plane wave dual basis.

In some implementations simulating the quantum system comprises using the first and second Hamiltonian.

In some implementations simulating the quantum system comprises simulating the kinetic energy operator in the plane wave basis; and simulating the potential energy operator in the plane wave dual basis.

In some implementations simulating the quantum system comprises applying a Trotter decomposition to a unitary time evolution operator that is determined by the first or second Hamiltonian.

In some implementations the Trotter decomposition is given by $$U = e^{-iTt/2} e^{-iVt} e^{-iTt/2} + O(t^3),$$

where U represents the unitary time evolution operator, T represents the kinetic operator and V represents the potential energy operator and the interaction term.

In some implementations simulating the quantum system using the second Hamiltonian comprises performing a variational algorithm using a variational ansatz based on the Trotter decomposition.

In some implementations V and T may be implemented at O(N) depth on a planar lattice.

In some implementations the quantum system comprises a system of electrons and the first Hamiltonian comprises an electronic structure Hamiltonian.

In some implementations the electronic structure Hamiltonian is given by $$H = \frac{1}{2}\sum_{p,\sigma} k_p^2 c_{p,\sigma}^\dagger c_{p,\sigma} \frac{4\pi}{\Omega}$$

$$\sum_{\substack{p \neq q \\ j,\sigma,\sigma'}} \left(\zeta_j \frac{e^{ik_{p-q} R_j}}{k_{q-p}^2}\right) c_{p,\sigma}^\dagger c_{q,\sigma'} \frac{2\pi}{\Omega} \sum_{\substack{(p,\sigma) \neq (q,\sigma') \\ \nu \neq 0}} \frac{c_{p,\sigma}^\dagger c_{q,\sigma}^\dagger c_{p+\nu,\sigma'} c_{q-\nu,\sigma}}{k_\nu^2}.$$

In some implementations the second Hamiltonian in the plane wave dual basis is given by $$H = \frac{1}{2N} \sum_{\nu,p,q,\sigma} k_\nu^2 \cos[k_\nu \cdot r_{q-p}] a_{p,\sigma}^\dagger a_{q,\sigma} \frac{4\pi}{\Omega} \sum_{\substack{p,\sigma \\ j,\nu \neq 0}} \frac{\zeta_j e^{ik_\nu \cdot (R_j - r_p)}}{k_\nu^2} n_{p,\sigma} +$$

$$\frac{2\pi}{\Omega} \sum_{\substack{(p,\sigma) \neq (q,\sigma') \\ \nu \neq 0}} \frac{\cos[k_\nu \cdot r_{p-q}]}{k_\nu^2} n_{p,\sigma} n_{q,\sigma'}.$$

In some implementations applying a discrete Fourier transform to the first Hamiltonian comprises applying a fermionic quantum Fourier transform.

In some implementations operators in the electronic structure Hamiltonian in the plane wave basis and operators in the second Hamiltonian in the plane wave dual basis are exactly isospectral.

In some implementations the plane wave dual basis comprises a set of functions representing a smooth approximation to a lattice grid obtained by applying a discrete Fourier transform to the plane wave basis.

The subject matter described in this specification can be implemented in particular ways so as to realize one or more of the following advantages.

Conventional techniques for simulating quantum systems, e.g., the electronic structure Hamiltonian, are typically computationally resource intense or intractable. As an example, quantum simulation of the electronic structure problem is an extensively researched application of quantum computing. Conventional quantum algorithms for simulating electronic structure Hamiltonians encode the wavefunctions using N nuclei-centered molecular orbitals, a convention inherited from classical methods. The associated Hamiltonians have $O(N^4)$ terms with N representing the number of basis functions required to represent the Hamiltonians, which may be more than can be simulated on near term quantum computers.

A system performing quantum simulations using a plane wave dual basis, as described in this application, transforms Hamiltonians in a plane wave basis by application of a discrete Fourier transform to Hamiltonians in a plane wave dual basis, where the Hamiltonians in the plane wave dual basis have only $O(N^2)$ terms. This reduction in the number of terms may provide several technical advantages. The amount of processing required to perform a simulation may be reduced, e.g., quantum hardware used to simulate the quantum system in the plane wave dual basis may be simpler and/or require a shorter set up time and less control operations to perform the simulation. This in turn can lead to a reduction in power resources consumed by the system, e.g., the quantum hardware used to simulate the quantum system in the plane wave dual basis may require less power to perform the simulation.

For example, the number of measurements required when performing a variational algorithm to simulate a quantum system using a Hamiltonian in the plane wave dual basis may be fewer compared to simulating the quantum system using a Hamiltonian in the plane wave basis. Each time a measurement is performed, the quantum system must be prepared in an initial state and operated on. Accordingly, by reducing the number of measurements, the number of times the quantum system is prepared in an initial state and operated on is reduced, resulting in reduced processing, resources and simulation time.

As another example, shorter Trotter steps can be implemented to simulate a quantum system when using a Hamiltonian in the plane wave dual basis compared to those implemented when a Hamiltonian in the plane wave basis is used. Shorter Trotter steps result in fewer processing resources, e.g., shorter quantum circuits that implement the Trotter steps, and reduced power consumption. Both of the above examples highlight the computational efficiency and cost reductions that the techniques described in this specification provide.

In addition, a Hamiltonian can be broken up into two parts—a kinetic energy part and a potential energy part (potential energy operator and interaction term). The potential energy part is a diagonal operator with $O(N^2)$ terms in the plane wave dual basis. The kinetic energy part is a diagonal operator with $O(N^2)$ terms in the plane wave basis. In their diagonal basis, both operators can be represented as a sum of Pauli Z and ZZ terms, which can be implemented at O(N) depth on a planar lattice (i.e., near term quantum computing devices).

Furthermore, by transforming a quantum state of a quantum system between the plane wave basis (where the kinetic energy operator is diagonal) and the plane wave dual basis (where the potential energy operator and interaction term are diagonal), e.g., using a fermionic quantum Fourier transform operator, Trotter steps can be simulated with O(N) depth on a planar lattice (i.e., on a near term quantum computing device). A variational ansatz may then be constructed using the Trotter steps that may be used to define a simulation procedure for preparing ground states.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes techniques for simulating quantum systems such as the electronic structure Hamiltonian. The techniques involve using a basis obtained from a unitary rotation of plane waves achieved via application of the quantum Fourier transform to the mode operators, called a plane wave dual basis. The plane wave dual basis diagonalizes the potential energy term of a Hamiltonian written in a plane wave basis, resulting in a Hamiltonian with $O(N^2)$ terms that can be efficiently simulated.

Example Hardware

Figure 1:
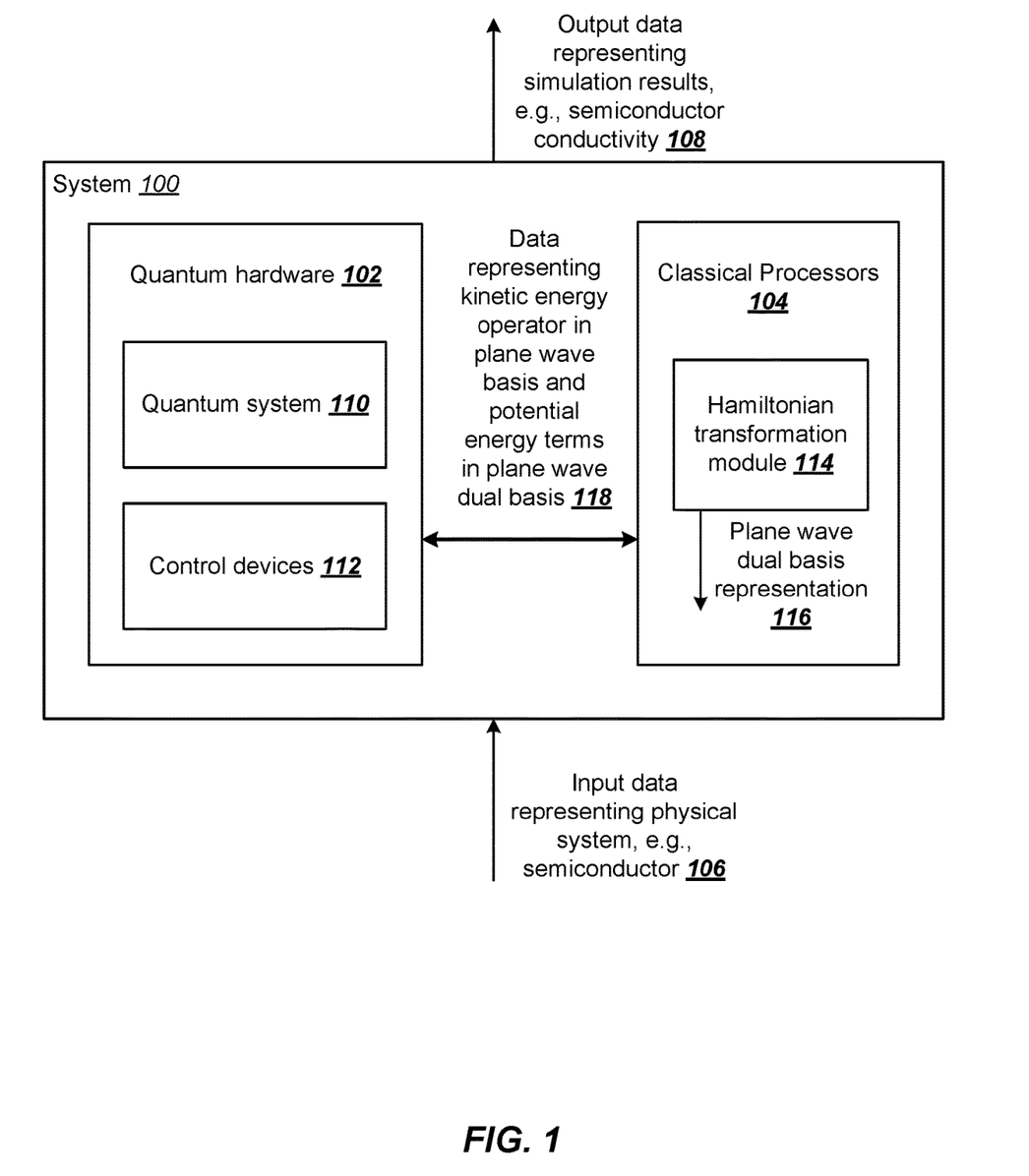
FIG. 1 depicts an example system for simulating a physical system.

FIG. 1 depicts an example system 100 for simulating a physical system. The example system 100 is an example of a system implemented as classical or quantum computer programs on one or more classical computers or quantum computing devices in one or more locations, in which the systems, components, and techniques described below can be implemented.

The system 100 includes quantum hardware 102 in data communication with a classical processor 104.

The system 100 may receive as input data specifying a physical system that is to be modeled or simulated, e.g., input data 106. For example, the received data may represent a material, e.g., a metal or polymer, or a chemical. The input data may include data representing a first Hamiltonian characterizing the physical system that is to be modeled or simulated. The first Hamiltonian may be written in a plane wave basis, as described in more detail below.

The system 100 may generate as output data representing results of a simulation of the physical system of interest, e.g., output data 108. The generated output data may be provided for further processing or analyzing. For example, in cases where the physical system is a material, e.g., a metal or polymer, the generated output data may include data representing a simulated ground state of the physical system that may be used to determine properties of the material, e.g., its conductivity.

The system 100 is configured to perform classical computations in combination with quantum computations using quantum hardware 102 and classical processors 104. The quantum hardware 102 may include components for performing quantum computation. For example, the quantum hardware 102 may include a quantum system 110 and control devices 112 for controlling the quantum system 112.

The quantum system 110 may include one or more multi-level quantum subsystems, e.g., qubits or qudits. In some implementations the multi-level quantum subsystems may be superconducting qubits, e.g., Gmon qubits. The type of multi-level quantum subsystems that the system 100 utilizes is dependent on the physical system of interest. For example, in some cases it may be convenient to include one or more resonators attached to one or more superconducting qubits, e.g., Gmon or Xmon qubits. In other cases ion traps, photonic devices or superconducting cavities (with which states may be prepared without requiring qubits) may be used. Further examples of realizations of multi-level quantum subsystems include fluxmon qubits, silicon quantum dots or phosphorus impurity qubits. In some cases the multi-level quantum subsystems may be a part of a quantum circuit. In this case the quantum hardware 102 may include one or more control devices 112 that implement quantum logic gates on the quantum system 110.

The type of control devices 112 included in the quantum hardware 102 depend on the type of qubits included in the quantum system 110. For example, in some cases the control devices 112 may include devices that control the frequencies of qubits included in the quantum system 110, e.g., an excitation pulse generator and control lines that couple the qubits to the excitation pulse generator. The control devices 112 may then cause the frequency of each qubit to be adjusted towards or away from a quantum gate frequency of an excitation pulse on a corresponding control driveline. The control devices 112 may further include measurement devices, e.g., readout resonators. Measurement results obtained via measurement devices may be provided to the classical processors 104 for processing and analyzing.

The classical processors 104 are configured to receive the input data 106 specifying the physical system to be modeled or simulated. For example, the classical processor may receive input data representing a first Hamiltonian characterizing the physical system to be simulated or modeled, or may receive other data specifying the physical system to be simulated or modeled and generate a corresponding first Hamiltonian.

The first Hamiltonian is written in a plane wave basis. Plane waves are waves whose wave fronts, i.e., surfaces of constant phase, are infinite parallel planes. A monochromatic or harmonic plane wave is a wave that has a single frequency such that the variation of amplitude is represented by a sine or cosine wave. Plane waves form a set of delocalized periodic basis functions. For example, in radial coordinates a basis of plane waves may be represented as complex exponentials given by $$\varphi_v(r) = \sqrt{\frac{1}{\Omega}} e^{ik_v \cdot r}$$

with $k_v = 2\pi v/\Omega^{1/3}$ and $$v \in \left[-N^{\frac{1}{3}}, N^{\frac{1}{3}}\right] \subset \mathbb{Z}^3,$$

and where the length scale of the basis is parameterized by computational cell volume $\Omega$.

Plane waves have several desirable properties as a basis. For example, their periodicity makes them a convenient choice for crystalline solids. As another example, by choosing the computational cell volume in which the periodic boundary conditions of the plane wave basis are defined to be sufficiently large or by using a truncated Coulomb operator, plane waves can be used to represent finite systems such as molecules.

The classical processors 104 process the received data representing the first Hamiltonian in the plane wave basis using a Hamiltonian transformation module 114 to generate data representing a corresponding second Hamiltonian written in a plane wave dual basis, e.g., data 116. The plane wave dual basis can be obtained by applying a unitary discrete Fourier transformation to the plane wave basis.

The unitary discrete Fourier transform of the plane wave basis can be computed in each dimension separately as $$\phi_{p_x}(x) = \sqrt{\frac{1}{N^{1/3}}} \sum_{v_x} \left(e^{-2\pi i \frac{p_x}{N^{\frac{1}{3}}}}\right)^{v'_x} \varphi_{v_x}(x) = \frac{1}{(\Omega N)^{1/6}} \sum_{v_x} \exp\left[2\pi i\left(\frac{x}{\Omega^{1/3}} - \frac{p_x}{N^{1/3}}\right)\right]^{v_x}$$

where $\phi_{p_x}(x)$ represents the x-component of the plane wave dual basis function $\phi_p(r)=\phi_{p_x}(x)\phi_{p_y}(y)\phi_{p_z}(z)$, $\varphi_{v_x}(x)$ represents the x-component of the plane wave basis function $\phi_v(r)=\phi_{v_x}(x)\phi_{v_y}(y)\phi_{v_z}(z)$, $v=(v_x, v_y, v_z)$ and $r=(x, y, z)$. Since $\phi_{p_x}(x)$ takes the form of a geometric series, a closed form representation of the plane wave dual basis functions $\phi_p(r)$ resembling a smooth approximation to a grid with lattice sites at the locations $r_p=p(\Omega/N)^{1/3}$ can be obtained.

The classical processors 104 may use both the first Hamiltonian and outputs from the Hamiltonian transformation module to simulate the physical system specified by the input data 106, e.g., to simulate unitary evolution of the physical system. For example, the classical processors 104 may be configured to simulate multiple Trotter steps under the kinetic energy operator in the first Hamiltonian (the Hamiltonian in which the kinetic energy operator is diagonal) and the potential energy operator and interaction term of the second Hamiltonian (the Hamiltonian in which the potential energy operator and interaction term are diagonal).

Alternatively, the quantum hardware 102 may be configured to simulate the evolution of the physical system specified by the input data 106 using the first Hamiltonian and the second Hamiltonian. For example, the classical processors 104 may be configured to provide the quantum hardware 102 with data representing the kinetic energy operator in the plane wave basis and the potential energy operator and interaction term in the plane wave dual basis, e.g., data 118, to the quantum hardware 102.

The quantum hardware 102 may be configured to use the received data to implement multiple Trotter steps under the kinetic energy operator in the first Hamiltonian (the Hamiltonian in which the kinetic energy operator is diagonal) and the potential energy operator and interaction term of the second Hamiltonian (the Hamiltonian in which the potential energy operator and interaction term are diagonal) by applying a quantum circuit effecting a unitary operator that is dependent on the first Hamiltonian and the second Hamiltonian on a state of the quantum system 110.

Programming the Hardware

Figure 2:
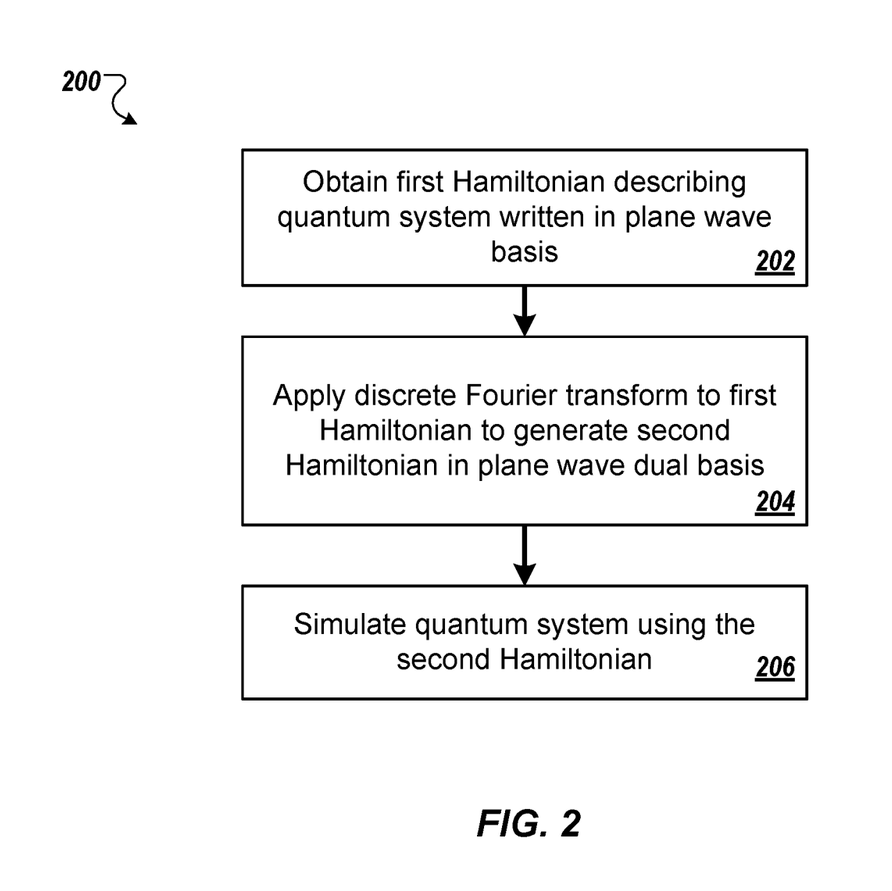
FIG. 2 is a flow diagram of an example process for simulating a quantum system using a plane wave dual basis.

FIG. 2 is a flow diagram of an example process 200 for simulating a quantum system. For convenience, the process 200 will be described as being performed by a system of one or more classical or quantum computing devices located in one or more locations. For example, a quantum computation system, e.g., the system 100 of FIG. 1, appropriately programmed in accordance with this specification, can perform the process 200.

The system obtains a first Hamiltonian describing the quantum system to be simulated. For example, the first Hamiltonian may be a Hamiltonian describing a material, e.g., a polymer airplane wing or rocket, solar cells, batteries, catalytic converts or thin-film electronics, or a Hamiltonian describing a chemical. The first Hamiltonian is written in a plane wave basis that includes N plane wave basis vectors, as described in more detail above with reference to FIG. 1.

The first Hamiltonian may include three terms—a kinetic energy operator T, an interaction term V, and a potential energy operator U. The kinetic energy operator T is a one-body operator that is diagonal in the plane wave basis. The interaction term V is a two-body operator that may not be diagonal in the plane wave basis. The potential energy operator U is a one-body operator that may not be diagonal in the plane wave basis.

In some implementations the process 200 may be used to simulate a system of electrons. In these implementations the first Hamiltonian may include an electronic structure Hamiltonian given by $$H = T + U + V \quad (1)$$

with $$T = \frac{1}{2} \sum_{p,\sigma} k_p^2 c_{p,\sigma}^\dagger c_{p,\sigma}$$

$$U = -\frac{4\pi}{\Omega} \sum_{p \neq q, j, \sigma, \sigma'} \left( \zeta_j \frac{e^{i k_{p-q} \cdot R_j}}{k_{q-p}^2} \right) c_{p,\sigma}^\dagger c_{q,\sigma'}$$

$$V = \frac{2\pi}{\Omega} \sum_{(p,\sigma) \neq (q,\sigma'), v \neq 0} \frac{c_{p,\sigma}^\dagger c_{q,\sigma'}^\dagger c_{p+v,\sigma'} c_{q-v,\sigma}}{k_v^2}$$

where the plane wave basis is defined subject to periodic boundary conditions in a computational cell of volume $\Omega$, $c_p^\dagger$, $c_p$ represent fermionic annihilation and creation operators, $\sigma \in \{1, -1\}$ represents a spin degree of freedom, $R_j$ represents nuclei coordinates, $\zeta_j$ represents nuclei charges, and where the operators have been truncated to the support of plane waves with frequencies $k_v = 2\pi v/\Omega^{1/3}$ such that $v$ represents a three-dimensional vector of integers with elements in $[-N^{1/3}, N^{1/3}]$ with N representing system size. In the summation notation of Equation (1), addition of momenta is carried out modulo the maximum momentum.

The system applies a unitary discrete Fourier transform, e.g., a fermionic quantum Fourier transform, to the first Hamiltonian in the plane wave basis to generate a second Hamiltonian in a plane wave dual basis (step 204). The plane wave dual basis and its relation to the plane wave basis is described in more detail above with reference to FIG. 1.

The second Hamiltonian may also include three terms—a kinetic energy operator T', an interaction term V', and a potential energy operator U'. The kinetic energy operator T' may not be diagonal in the plane wave dual basis. The potential energy operator U' is a one-body operator that is diagonal in the plane wave dual basis. The interaction term V' is a two-body operator that is diagonal in the plane wave dual basis. In cases where the process 200 is used to simulate a system of electrons and the first Hamiltonian is given by the electronic structure Hamiltonian described above with reference to step 202, the second Hamiltonian in the plane wave dual basis may be given by $$H' = T' + U' + V'$$

with $$T' = \frac{1}{2N} \sum_{v,p,q,\sigma} k_v^2 \cos[k_v \cdot r_{q-p}] a_{p,\sigma}^\dagger a_{q,\sigma}$$

$$U' = -\frac{1}{N} \sum_{p',q'} \sum_{p \neq q, j, \sigma} \zeta_j V_{p-q} \exp[i k_{q-p} \cdot$$

$$(R_j - r_{p'})](a_{p',\sigma}^\dagger a_{q',\sigma} \exp[i k_q \cdot r_{q'-p'}])$$

$$= -\frac{4\pi}{\Omega} \sum_{p,\sigma,j \neq 0, v \neq 0} \frac{\zeta_j \cos[k_v \cdot (R_j - r_p)]}{k_v^2} n_{p,\sigma}$$

and $$V' = \frac{2\pi}{\Omega} \sum_{(p,\sigma) \neq (q,\sigma'), v \neq 0} \frac{\cos[k_v \cdot (r_{p-q})]}{k_v^2} n_{p,\sigma} n_{q,\sigma'}$$

where $\Omega$ represents computational cell volume, $\alpha_p^\dagger$, $\alpha_p$ represent fermionic annihilation and creation operators defined via $$c_v^\dagger = \sqrt{\frac{1}{N}} \sum_p a_p^\dagger e^{-i k_v \cdot r_p}$$

and $$c_v = \sqrt{\frac{1}{N}} \sum_p a_p e^{i k_v \cdot r_p},$$

$\sigma \in \{1, -1\}$ represents a spin degree of freedom, $R_j$ represents nuclei coordinates, $\zeta_j$ represents nuclei charges, and where the operators have been truncated to the support of plane waves with frequencies $k_v = 2\pi v/\Omega^{1/3}$ such that $v$ represents a three-dimensional vector of integers with elements in $[-N^{1/3}, N^{1/3}]$ with N representing system size, and $$r_p = p \left( \frac{\Omega}{N} \right)^{1/3}$$

represents lattice site locations (see FIG. 1).

In the plane wave dual basis, the second Hamiltonian includes $O(N^2)$ terms. Due to the unitarity of the discrete Fourier transform, the operators in Equations (1) and (2) are exactly isospectral—there is no loss of accuracy associated with using one representation instead of the other. Thus, the plane wave dual basis offers all advantages of the plane wave basis whilst including only $O(N^2)$ terms and therefore being more efficient to simulate.

The system simulates the quantum system using the second Hamiltonian (step 206). Simulating the quantum system may include using both the first Hamiltonian described in Equation (1) and the second Hamiltonian described in Equation (2). For example, simulating the quantum system may include simulating the kinetic energy operator in the plane wave basis (the basis in which the kinetic energy operator is diagonal) and simulating the potential energy operator and the interaction term in the plane wave dual basis (the basis in which the potential energy operator and the interaction term are diagonal).

Simulating the quantum system may include applying a Trotter decomposition to a unitary time evolution operator that is determined by the first or second Hamiltonian. For example, the Trotter decomposition may be given by $$U = e^{-iTt/2} e^{-iVt} e^{-iTt/2} + O(t^3),$$

where U represents the unitary time evolution operator, T represents the kinetic energy operator and V represents the potential energy term (potential energy operator and interaction term). In some implementations simulating the quantum system using the second Hamiltonian may include performing a variational algorithm using a variational ansatz based on the Trotter decomposition.

In some cases it may be beneficial to map the first Hamiltonian in the plane wave basis and the second Hamiltonian in the plane wave dual basis to a qubit Hamiltonian before simulating the quantum system, e.g., using the Jordan-Wigner transformation. In the qubit Hamiltonian, the kinetic energy operator and the potential energy term may be represented in terms of pauli Z and ZZ operators, for which efficient quantum circuits exist.

Results of the simulation performed by the system can be provided for analysis and post processing. For example, in some cases the first Hamiltonian may be an electronic structure Hamiltonian that characterizes the electronic structure of a semiconductor. In these cases simulating the quantum system may include simulating properties of the semiconductor, e.g., simulating the conductivity or resistance of the semiconductor. Such simulation results may be used to fabricate semiconductor devices, e.g., integrated circuits.

As another example, in some cases the first Hamiltonian may be an electronic structure Hamiltonian that characterizes a catalyst. In these cases simulating the quantum system may include simulating properties of the catalyst, e.g., simulating catalytic activity. Such simulation results may be used to fabricate catalysts, e.g., electrocatalysts or biocatalysts.

In some implementations the system may use the obtained first Hamiltonian in the plane wave basis and the generated second Hamiltonian in the plane wave dual basis to perform additional operations. For example, the system may efficiently prepare the quantum system in an initial state for classes of interesting physical systems whose ground state is well approximated by a mean-field state of delocalized electron orbitals, or may use the different Hamiltonians to perform quantum measurements with increased efficiency, by rotating the quantum system from the plane wave dual basis (where the potential energy operator and interaction term are diagonal) to the plane wave basis (where the kinetic operator is diagonal) using an efficient quantum circuit that is related to the fast Fourier transform.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for simulating a quantum system, comprising:
configuring quantum computing hardware comprising a plurality of qubits and one or more control devices according to a qubit Hamiltonian, wherein the qubit Hamiltonian comprises a mapping of a first Hamiltonian of the quantum system written in a plane wave basis to a second Hamiltonian written in a plane wave dual basis, wherein the second Hamiltonian comprises a number of terms that scales at most quadratically with N, wherein N is a number of plane wave basis vectors; and
simulating, by the quantum computing hardware, the quantum system using the qubit Hamiltonian.

2. The method of claim 1, wherein simulating the quantum system using the qubit Hamiltonian comprises:
preparing the plurality of qubits in an initial state;
simulating unitary evolution of the plurality of qubits using the qubit Hamiltonian; and
measuring the plurality of qubits.

3. The method of claim 1, wherein simulating the quantum system using the qubit Hamiltonian comprises using the first Hamiltonian and the second Hamiltonian.

4. The method of claim 1, wherein the first Hamiltonian comprises a kinetic energy operator T that is diagonal in the plane wave basis.

5. The method of claim 4, wherein the second Hamiltonian comprises a potential energy operator and interaction term that are diagonal in the plane wave dual basis.

6. The method of claim 5, wherein simulating the quantum system comprises:
simulating the kinetic energy operator in the plane wave basis; and
simulating the potential energy operator and the interaction term in the plane wave dual basis.

7. The method of claim 1, wherein simulating the quantum system comprises:
applying a Trotter decomposition to a unitary time evolution operator that is determined by the first Hamiltonian or the second Hamiltonian.

8. The method of claim 7, wherein the Trotter decomposition is given by $$U = e^{-iTt/2} e^{-iVt} e^{-iTt/2} + O(t^3),$$

where U represents the unitary time evolution operator, T represents a kinetic operator and V represents a potential energy term comprising a potential energy operator and interaction term.

9. The method of claim 7, wherein simulating the quantum system using the qubit Hamiltonian comprises performing a variational algorithm using a variational ansatz based on the Trotter decomposition.

10. The method of claim 1, wherein the quantum system comprises a system of electrons and the first Hamiltonian comprises an electronic structure Hamiltonian.

11. The method of claim 10, wherein the electronic structure Hamiltonian is given by $$H = \frac{1}{2} \sum_{p,\sigma} k_p^2 c_{p,\sigma}^\dagger c_{p,\sigma} -$$

$$\frac{4\pi}{\Omega} \sum_{\substack{p \neq q \\ j,\sigma,\sigma'}} \left( \zeta_j \frac{e^{ik_{p-q} \cdot R_j}}{k_{q-p}^2} \right) c_{p,\sigma}^\dagger c_{q,\sigma'} + \frac{2\pi}{\Omega} \sum_{\substack{(p,\sigma) \neq (q,\sigma') \\ v \neq 0}} \frac{c_{p,\sigma}^\dagger c_{q,\sigma'}^\dagger c_{p+v,\sigma'} c_{q-v,\sigma}}{k_v^2}.$$

$$H = \frac{1}{2} \sum_{p,\sigma} k_p^2 c_{p,\sigma}^\dagger c_{p,\sigma} \frac{4\pi}{\Omega}$$

$$\sum_{\substack{p \neq q \\ j,\sigma,\sigma'}} \left( \zeta_j \frac{e^{ik_{p-q} R_j}}{k_{q-p}^2} \right) c_{p,\sigma}^\dagger c_{q,\sigma'} \frac{2\pi}{\Omega} \sum_{\substack{(p,\sigma) \neq (q,\sigma') \\ v \neq 0}} \frac{c_{p,\sigma}^\dagger c_{q,\sigma'}^\dagger c_{p+v,\sigma'} c_{q-v,\sigma}}{k_v^2}.$$

where $k_p$ represents plane wave frequencies, $c_p^\dagger$, $c_p$ represent fermionic annihilation and creation operators, $\sigma \in \{1, -1\}$ represents a spin degree of freedom, $R_j$ represents nuclei coordinates $\zeta_j$ represents nuclei charges and $\Omega$ is a volume of the quantum system.

12. The method of claim 11, wherein the second Hamiltonian in the plane wave dual basis is given by $$H = \frac{1}{2N} \sum_{v,p,q,\sigma} k_v^2 \cos[k_v \cdot r_{q-p}] a_{p,\sigma}^\dagger a_{q,\sigma} -$$

$$\frac{4\pi}{\Omega} \sum_{\substack{p,\sigma \\ j,v \neq 0}} \frac{\zeta_j e^{ik_v \cdot (R_j - r_p)}}{k_v^2} n_{p,\sigma} + \frac{2\pi}{\Omega} \sum_{\substack{(p,\sigma) \neq (q,\sigma') \\ v \neq 0}} \frac{\cos[k_v \cdot r_{p-q}]}{k_v^2} n_{p,\sigma} n_{q,\sigma'}.$$

where $\alpha_p^\dagger$, $\alpha_p$ represent fermionic annihilation and creation operators in the dual plane wave basis, $r_p$ represents lattice site locations and $n_p = \alpha_p^\dagger \alpha_p$.

13. The method of claim 12, wherein applying a discrete Fourier transform to the first Hamiltonian comprises applying a fermionic quantum Fourier transform.

14. The method of claim 10, wherein operators in the electronic structure Hamiltonian in the plane wave basis and operators in the second Hamiltonian in the plane wave dual basis are exactly isospectral.

15. The method of claim 1, wherein the plane wave dual basis comprises a set of functions representing a smooth approximation to a lattice grid obtained by applying a discrete Fourier transform to the plane wave basis.

16. An apparatus comprising:
quantum computing hardware comprising:
a quantum system comprising one or more qubits, and one or more control devices configured to operate the quantum system;
wherein the apparatus is configured to perform operations comprising:
configuring quantum computing hardware comprising a plurality of qubits and one or more control devices according to a qubit Hamiltonian, wherein the qubit Hamiltonian comprises a mapping of a first Hamiltonian of the quantum system written in a plane wave basis to a second Hamiltonian written in a plane wave dual basis, wherein the second Hamiltonian comprises a number of terms that scales at most quadratically with N, wherein N is a number of plane wave basis vectors; and
simulating, by the quantum computing hardware, the quantum system using the qubit Hamiltonian.

17. The apparatus of claim 16, wherein simulating the quantum system using the qubit Hamiltonian comprises:
preparing the plurality of qubits in an initial state;
simulating unitary evolution of the plurality of qubits using the qubit Hamiltonian; and
measuring the plurality of qubits.

18. The apparatus of claim 16, wherein simulating the quantum system using the qubit Hamiltonian comprises using the first Hamiltonian and the second Hamiltonian.

19. The apparatus of claim 16, wherein the first Hamiltonian comprises a kinetic energy operator T that is diagonal in the plane wave basis and the second Hamiltonian comprises a potential energy operator and interaction term that are diagonal in the plane wave dual basis.

20. The apparatus of claim 19, wherein simulating the quantum system comprises:
  simulating the kinetic energy operator in the plane wave basis; and
  simulating the potential energy operator and the interaction term in the plane wave dual basis.

* * * * *